3,174,955
ACRYLIMIDE MONOMERS AND THEIR
POLYMERS
William B. Black, Raleigh, N.C., assignor, by mesne
assignments, to Monsanto Company, a corporation of
Delaware
No Drawing. Filed June 26, 1961, Ser. No. 119,282
11 Claims. (Cl. 260—85.5)

This invention relates to new monomers and to new polymeric materials derivable therefrom. More particularly, it relates to a new class of cyclic monomeric acrylimides, and to the polymerization products, such as homopolymers and copolymers derivable therefrom.

Thus, the broad object of this invention is to provide new cyclic compounds of the acrylimide type.

A further object is the preparation of new monomers which can be homopolymerized and, with other addition polymerizable monomers copolymerized.

A still further object is the preparation of novel polymers and copolymers.

Other objects will appear hereinafter.

The new cyclic acrylimide compounds of the present invention have the general formula:

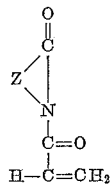

wherein Z represents

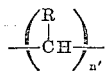

where $n'$ is an integer from 3 to 6 and R represents a member of the group consisting of H and lower alkyl groups of from 1 to 4 carbon atoms.

These compounds, which may also be called N-acrylyllactams, can be derived from the reaction of an acrylyl halide, preferably acrylyl chloride, with an alkali metal salt of a 5 to 8 membered ring lactam.

Examples of lactams, which may be employed after conversion to the alkali metal salt thereof, are 2-pyrrolidone, 2-piperidone, 2-caprolactam and 2-enantholactam. Compounds of this type which are substituted on one or more of the methylene groups, preferably lower alkyl radicals having up to 4 carbons may also be used. Illustrative examples are 3-ethyl-2-pyrrolidone; 3,4-dimethyl-2-pyrrolidone; 3,4,5-trimethyl-2-pyrrolidone, 3-propyl-2-piperidone; 3,4,5,6-tetramethyl-2-piperidone; 3-methyl-2-caprolactam; 3,5-diethyl-2-caprolactam; 4-butyl-2-caprolactam, 3-ethyl-2-enantholactam and others.

The alkali metal salts of the aforenoted lactams are easily prepared by standard methods. For example, the hydride of an alkali metal is introduced into a suitable reaction medium; such as dioxane, to which is added the lactam of choice. Hydrogen is evolved as the alkali salt of the lactam is formed. Alternatively, the hydroxide of an alkali metal is added to the lactam in a suitable solvent, such as benzene, and the water formed is removed by azeotropic distillation. Although any of the alkali metals may be employed, in most instances sodium and potassium are preferred.

The acrylyl halides employed in forming the new compounds of this invention have the general formula: $CH_2=CHCOX$ where X may be chlorine, bromine or fluorine. Because of the obvious difficulties in handling compounds of bromine and fluorine, acrylyl chloride is the reactant of choice. Preparations for the acrylyl chloride are well known, for example it may be prepared by splitting off hydrogen chloride from β-chloropropionyl chloride or by the action of phosphorus oxychloride on sodium acrylate in mineral oil.

A typical reaction, which may be used in producing the monomers of this invention is a simple condensation and may be graphically presented as follows:

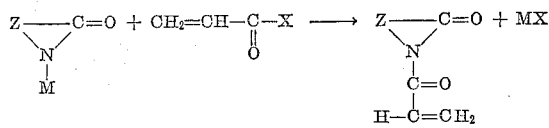

where M is an alkali metal; Z represents

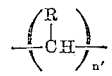

where $n'$ is an integer from 3 to 6; R represents a member of the group consisting of H and lower alkyl groups of from 1 to 4 carbon atoms; and where X is a halide.

The aforenoted reactants are generally employed in equimolecular quantities. However, either reactant may be present in molar excess over the other, but there are no advantages to be derived in such instances. The reaction is desirably carried out under anhydrous conditions. Inert solvents such as dioxane, may be used in carrying out the reaction which can be effected at temperatures in the range of from 0° C. to 60° C. without the necessity for a catalyst. Although nitrogen blanketing is not an essential requirement, it may be advantageous for the preservation of anhydrous conditions. Generally, the reaction may be completed in a period of from one to eight hours depending on the particular reactants used and the temperature employed.

The new acrylyllactam compounds of the invention are fully capable of self-polymerization to give valuable homopolymers. In addition, they may be used to form copolymers in polymerization reactions with other monomers.

In its broader aspects, this invention contemplates the preparation of copolymers obtained by the interpolymerization of the new acrylyllactam compounds with polymerizable compounds containing the vinyl groups

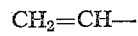

to give polymers which are useful as extrusion, molding and fiber-forming materials. Examples of vinyl compounds that can be copolymerized with the new monomers of this invention include, for example, acrylonitrile, methyl methacrylate, vinyl chloride, vinyl esters of carboxylic acids (e.g. vinyl acetate, vinyl stearate, vinyl benzoate, etc.), vinyl alkyl ketones (e.g. methyl vinyl ketone, ethyl vinyl ketone, trifluoromethyl vinyl ketone, etc.), acrylic acid, acrylic anhydride, acrylamide, N-alkyl acrylamides, and the methyl, ethyl, butyl, benzyl and phenyl esters of acrylic acid, styrenes (e.g. styrene, o-methyl styrene, p-methyl styrene, etc.), methacrylic acid and its anhydride, methacrylamide, N-alkyl methacrylamide, methacrylonitrile and the methyl, ethyl, butyl, benzyl and phenyl esters of methacrylic acid, vinylidine chloride, alkyl esters of maleic and fumaric acids such as methyl maleate, fumaronitrile, vinyl lactams, such as N-vinylpyrrolidone and the like.

Polymerizations with the new monomers of this invention can be carried out by bulk, solution, suspension or emulsion techniques. They can be initiated by heat, actinic irradiation, and by catalysts which are known to promote the polymerization of vinyl and other unsaturated organic compounds. Examples of suitable catalysts are peroxides e.g. benzoyl peroxide, acetyl peroxide, lauryl peroxide, tertiary butyl hydroperoxide, persulfates such as ammonium persulfate, sodium persulfate, potassium persulfate, persulfuric acid, etc., perborates such as sodium perborate and other alkali perborates, the water-soluble salts of percarbonic acid, the water-soluble salts of perphosphoric acid, azo-bis-isobutyronitrile. etc. The organic peroxides and azo-bis-isobutyronitrile are especially suitable. An activation agent such as sodium bisulfite can be used, if desired, in conjunction with such polymerization catalysts as the persulfates.

In order to illustrate the invention in greater detail, the following examples of specific monomer and polymer preparations are presented starting with a preparation of the monomer N-acrylylpyrrolidone. It is to be understood that the examples are given by way of illustration only and are not intended to be limitative. Parts are given by weight unless otherwise indicated.

Example I

In preparing N-acrylylpyrrolidone, the sodiopyrrolidone intermediate was first prepared by introducing one mol (85.1 grams) of purified pyrrolidone into 600 ml. of benzene. Then one mol (40.0 grams) of sodium hydroxide pellets was added. The mixture was stirred mechanically and the water stripped off azeotropically using a Dean-Stark trap.

There was then assembled an apparatus consisting of a five-necked round bottom flask, the necks being fitted with a water-cooled condenser protected with an anhydrous calcium sulfate filled drying tube, a sealed mechanical stirrer, a thermometer and an inlet for dry nitrogen. A separatory funnel fitted with a mechanical stirrer in the bowl was positioned immediately above the flask and adapted for dropping small increments of the contents therein directly into the flask.

Into the flask of the above-described apparatus there was placed a mixture of one mol (90.6 grams) of freshly distilled acrylyl chloride and 300 ml. of benzene which had been dried over calcium hydride, while a slurry of one mol of the above-prepared sodiopyrrolidone in benzene was poured into the separatory funnel where it was kept under dry nitrogen while being dispersed with stirring. The slurry was then added in small increments to the stirred benzene solution of acrylyl chloride which had been cooled to 3° C., with the reaction system being kept constantly under a stream of dry nitrogen. The incremental addition took one and one-half hours. The reaction temperature during this time was maintained at about 5° C. The mixture was then stirred an additional four hours while allowing the temperature to rise gradually to 20° C. The mixture was then filtered and 0.14 grams of hydroquinone was added to the filtrate to minimize the tendency for polymerization to occur. The benzene was thereafter stripped from the filtrate using steam heat and 25 mm. of pressure. The residue, 160.5 grams, was fractionally distilled with two cuts being taken at relatively low temperatures; they amounted to 58 grams. Then a cut of 51.4 grams was taken at 100–105° C. and 1.0 mm. of pressure. At this point the residue in the pot was semi-solid polymer, it weighed approximately 50 grams.

In order to establish that the 51.4 gram cut was acrylylpyrrolidone, its infra-red spectrum was compared with the infra-red spectrum of pyrrolidone. The large N–H band found in pyrrolidone at 2.9 microns was almost completely absent, but a very sharp, distinct band was found at 6.1 microns. This band which is characteristic of carbon-carbon unsaturation was not present in the pyrrolidone spectrum. The spectrum of the newly prepared material also had two sharp, distinct carbonyl bands instead of the one rather broad band for pyrrolidone. Thus, it was established that the product produced was in fact N-acrylylpyrrolidone.

Example II

This example illustrates the preparation of a homopolymer from the monomer N-acrylylpyrrolidone by the solution technique.

10.0 grams of the N-acrylylpyrrolidone prepared above was mixed with 100 ml. of benzene which had been dried over calcium hydride and to this solution was added 0.04 gram of a benzoyl peroxide catalyst—0.4 percent by weight on the weight of the monomer. The solution was brought to a gentle reflux in a 250 ml., three-necked flask fitted with a water jacketed condenser protected from moisture by an anhydrous calcium sulfate filled drying tube. The vessel was swept continuously with a slow stream of dry nitrogen, while the contents thereof were stirred with a magnetic stirrer. After 10 minutes at reflux the flask was coated with white polymer. After one hour there was a large lump of white, dough-like polymer in the pot. Seven more hours of reflux resulted in no further change in the reaction mixture. After cooling, the benzene was decanted from the polymer. Then two 100 ml. portions of cyclohexane were poured over the polymer followed by decantation after each addition. Thereafter the polymer was allowed to stand two days in cyclohexane at room temperature during which time it became very hard. The cyclohexane was then decanted, and the residual cyclohexane in the polymer was removed with a vacuum. The polymer yield was essentially quantitative.

The polymer produced was pure white and remained so even when heated at 250° C. in air for 15 minutes. It was easily soluble in warm formic acid (98 to 100%) to such an extent that a thick dope was readily obtained. From the formic acid dope clear films of the polymer were prepared.

Example III

This example illustrates the preparation of a copolymer from N-acrylylpyrrolidone and styrene.

To a three-necked flask equipped with a reflux condenser, a mechanical stirrer and an inlet for dry nitrogen, there was added 0.05 mol (6.96 gms.) of N-acrylylpyrrolidone, 0.05 mol (5.21 gms.) of freshly distilled styrene and 100 ml. of dry benzene. To this solution of monomers there was further added (0.048 gm.) 0.4 percent on the weight of the monomeric material of a benzoyl peroxide catalyst. Thereafter the mixture was brought to gentle reflux using an oil bath. One-half of the reaction mixture was then removed for another experiment. The remainder was permitted to continue reaction for 18 hours after which the heat was removed and there was gradually added 560 ml. of methanol to the mixture. This caused the copolymer to precipitate from solution. The resulting polymer was then filtered and dried. It was found to be present in an amount of 1.74 grams, constituting a yield of 29 percent of the theoretical. The polymer was very white and crystalline in appearance and found to be soluble in 2-pyrrolidone.

Example IV

This example illustrates the copolymerization of N-acrylylpyrrolidon with acrylonitrile.

A mixture was prepared consisting of 0.02 mol (2.8 gms.) of N-acrylylpyrrolidone prepared in accordance with Example I above, 0.2 mol (10.6 gms.) of acrylonitrile, 0.13 gram of the catalyst azo-bis-isobutyronitrile (1% on the weight of the monomers), and 50 ml. of ethylene carbonate. This mixture was then placed in a vessel equipped with a stirrer and an inlet for dry nitrogen. The reactants were brought to a temperature of 50° C. and permitted to react over a period of twenty-one hours. After five and one-half hours the reaction mixture was so thick that nitrogen bubbles could barely get through. After the twenty-one hour reaction period, the reaction medium was permitted to cool to room temperature after which the polymer was precipitated from solution with methanol. The precipitated polymer was then filtered, re-washed with methanol and finally dried. The polymer yield was 12.0 grams or 90 percent of theoretical.

1.0 grams of the dried polymer was easily dissolved in 9.0 grams of dimethyl formamide to give a dope that was clear and free of any gel.

*Example V*

This example illustrates the preparation of the N-acrylylcaprolactam monomer.

The potassiocaprolactam intermediate was first prepared by introducing one mol (113.2 gms.) of highly purified caprolactam and one mol (66.0 gms.) of powdered potassium hydroxide in 600 ml. of benzene. Then 10.0 ml. of water was added to help solubilize the potassium hydroxide. The mixture was brought to reflux with moderate stirring and the water was stripped off azeotropically using a Dean-Stark trap.

There was then assembled an apparatus consisting of a five-necked round bottom flask, the necks being fitted with a water-cooled condenser protected with an anhydrous calcium sulfate filled drying tube, a sealed mechanical stirrer, a thermometer and an inlet for dry nitrogen. A separatory funnel fitted with a mechanical stirrer in the bowl was positioned immediately above the flask and adapted for dropping small increments of the contents therein directly into the flask.

Into the flask of the above-described apparatus there was placed a mixture of 0.9 mol (81.6 gms.) of freshly distilled acrylyl chloride and 200 ml. of dried benzene while a slurry of 0.95 mol of the above-prepared potassiocaprolactam in benzene was poured into the separatory funnel where it was kept under dry nitrogen while being dispersed with stirring. The slurry was then added in small increments to the stirred benzene solution of acrylyl chloride over a period of one and one-half hours and the temperature of the resulting reaction mixture was not allowed to exceed 10° C. This mixture was then permitted to warm up gradually until room temperature was reached in about one and one-half hours. It was then filtered and 0.3 gram of hydroquinone was added to the filtrate to inhibit polymerization. The benzene was thereafter stripped from the filtrate using steam heat and 25 mm. of pressure. The residue was fractionally distilled. After a fore-cut of 5.4 grams, a 22.7 grams cut of monomer was obtained at 85–90° C. and 0.23 mm. of pressure. The residue in the pot at 116° C. was quite viscous due to the formation of polymer.

The polymers produced by the new monomers of this invention have valuable properties, for example, in the making of films, as has been demonstrated in the foregoing examples. They may also be adapted for other end-uses to which polymers are often applied such as, coatings, lacquers, fibers and plastics.

The monomers of this invention have still further utility in that they have been found useful as activators for the anionic polymerization of lactams; for example, N-acrylylpyrrolidone is an excellent activator for the anionic polymerization of pyrrolidone. The polymers and copolymers of this invention may also be employed as polyactivators for the anionic polymerization of lactams to give graft copolymers, that is, polylactam side chains are grafted to the poly-N-acrylyllactam backbone through the pendant lactams. For example, pyrrolidone chains can be grafted onto polyacrylylpyrrolidone at the pendant pyrrolidone units of polyacrylylpyrrolidone.

Various modifications of the invention as described above will be apparent to those skilled in polymer chemistry. Hence, it will be understood that the invention is not limited to the foregoing description except as it is defined in the appended claims.

I claim:

1. The monomeric compound having the formula:

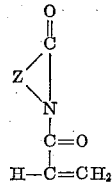

wherein Z represents

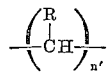

where $n'$ is an integer from 3 to 6 and R represents a member of the group consisting of H and lower alkyl groups of from 1 to 4 carbon atoms.

2. The monomeric compound having the formula:

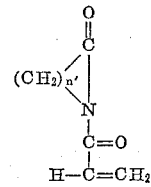

wherein $n'$ is an integer of from 3 to 6.

3. The monomeric compound having the formula:

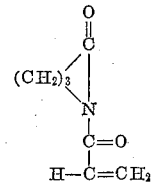

4. The monomeric compound having the formula:

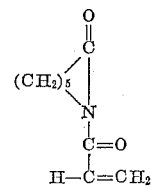

5. A process for preparing a compound having the formula:

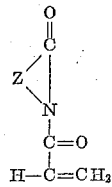

wherein Z represents

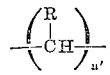

where $n'$ is an integer from 3 to 6 and R represents a member of the group consisting of H and lower alkyl groups of from 1 to 4 carbon atoms; which comprises reacting an acrylyl halide having the formula:

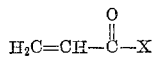

wherein X is selected from the group consisting of chlorine, bromine and fluorine with a lactam salt of the formula:

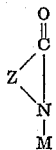

wherein M is an alkali metal; and Z represents

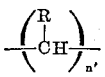

where $n'$ is an integer from 3 to 6 and R represents a member of the group consisting of H and lower alkyl groups of from 1 to 4 carbon atoms.

6. A process for preparing a compound having the formula:

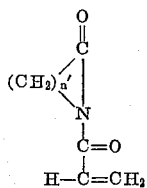

wherein $n'$ is an integer of from 3 to 6 which comprises reacting an acrylyl halide having the formula:

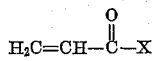

wherein X is selected from the group consisting of chlorine, bromine and fluorine with a lactam salt of the formula:

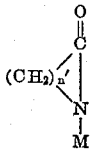

wherein M is an alkali metal; and $n'$ is an integer of from 3 to 6.

7. The homopolymer of a monomer having the formula:

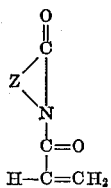

wherein Z represents

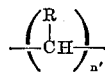

where $n'$ is an integer from 3 to 6 and R represents a member of the group consisting of H and lower alkyl groups of from 1 to 4 carbon atoms.

8. The homopolymer of a monomer having the formula:

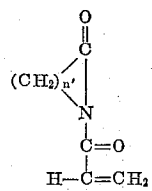

wherein $n'$ is an integer of from 3 to 6.

9. The copolymer of a polymerizable monomer having the vinyl group $CH_2=CH-$ and a compound of the formula:

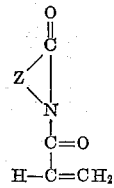

wherein Z represents $$-\left(\underset{\underset{n'}{|}}{\overset{R}{\underset{|}{C}H}}\right)-$$

where $n'$ is an integer from 3 to 6 and R represents a member of the group consisting of H and lower alkyl groups of from 1 to 4 carbon atoms.

10. The copolymer of styrene and a compound having the formula:

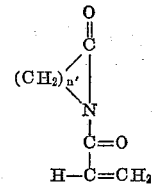

wherein $n'$ is an integer of from 3 to 6.

11. The copolymer of acrylonitrile and a compound having the formula:

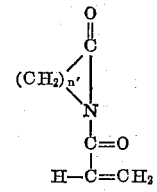

wherein $n'$ is an integer of from 3 to 6.

References Cited by the Examiner

UNITED STATES PATENTS

| | | | |
|---|---|---|---|
| 2,728,739 | 8/52 | Jones | 260—88.3 |
| 2,749,355 | 6/56 | Jones | 260—88.3 |

LEON J. BERCOVITZ, *Primary Examiner.*

H.N. BURSTEIN, J. R. LIBERMAN, W. H. SHORT,
*Examiners.*